(12) United States Patent
Crary et al.

(10) Patent No.: US 7,565,837 B2
(45) Date of Patent: Jul. 28, 2009

(54) FUEL LEVEL SENSOR VARIABLE RESISTOR ASSEMBLY

(75) Inventors: Lynwood F. Crary, Preston, CT (US); Daniel A. Gilmour, West Hartford, CT (US); Mark R. Johansen, Wallingford, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 271 days.

(21) Appl. No.: 11/417,023

(22) Filed: May 3, 2006

(65) Prior Publication Data

US 2006/0266112 A1    Nov. 30, 2006

Related U.S. Application Data

(60) Provisional application No. 60/684,272, filed on May 25, 2005.

(51) Int. Cl.
*G01F 23/00* (2006.01)
(52) U.S. Cl. .............................. 73/313; 73/305; 73/317
(58) Field of Classification Search ................ 73/313, 73/305, 317
See application file for complete search history.

(56) References Cited

U.S. PATENT DOCUMENTS

| | | | |
|---|---|---|---|
| 5,746,088 A | 5/1998 | Sawert et al. | |
| 6,021,668 A | 2/2000 | Sawert et al. | |
| 6,127,916 A | 10/2000 | Cooper et al. | |
| 6,212,950 B1* | 4/2001 | Cooper et al. | 73/313 |
| 6,425,288 B1 | 7/2002 | Pauer | |
| 6,588,288 B1 | 7/2003 | Swindler | |
| 6,658,934 B1* | 12/2003 | Housey et al. | 73/317 |
| 6,868,724 B2 | 3/2005 | Brzozowski et al. | |
| 6,877,373 B2 | 4/2005 | Gilmour et al. | |
| 6,886,403 B2* | 5/2005 | LaBarge et al. | 73/304 C |
| 6,985,067 B2* | 1/2006 | Dedert et al. | 338/162 |
| 6,985,068 B2* | 1/2006 | Dedert et al. | 338/162 |

* cited by examiner

*Primary Examiner*—Hezron Williams
*Assistant Examiner*—Rodney T Frank
(74) *Attorney, Agent, or Firm*—Reising Ethington P.C.

(57) ABSTRACT

A variable resistor assembly is preferably adapted for use with a fuel level sensor and includes an arcuate resistive area including a plurality of radially oriented and spaced apart conductive contact segments, and further includes a wiper including an arm and at least two contactors carried by the arm, wherein the at least two contactors are arranged on the arm such that the at least two contactors make contact with one of the conductive contact segments before breaking contact with an adjacent one of the conductive contact segments. Preferably, the at least two contactors are laterally offset with respect to one another and/or oriented at an angle with respect to the conductive contact segments.

23 Claims, 7 Drawing Sheets

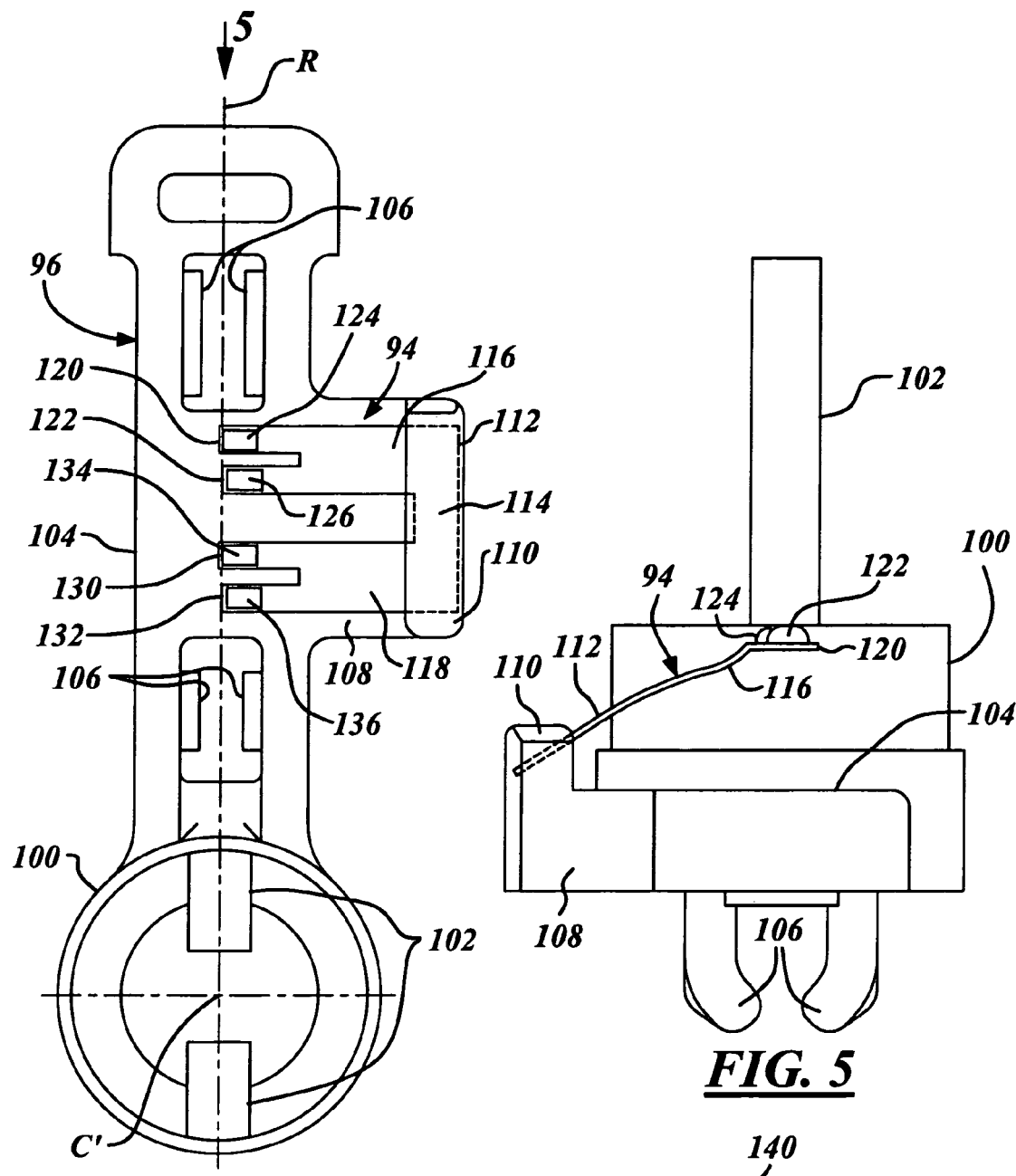
FIG. 4
FIG. 5
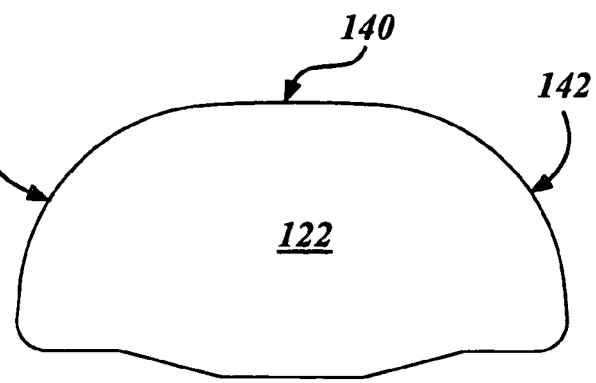
FIG. 6

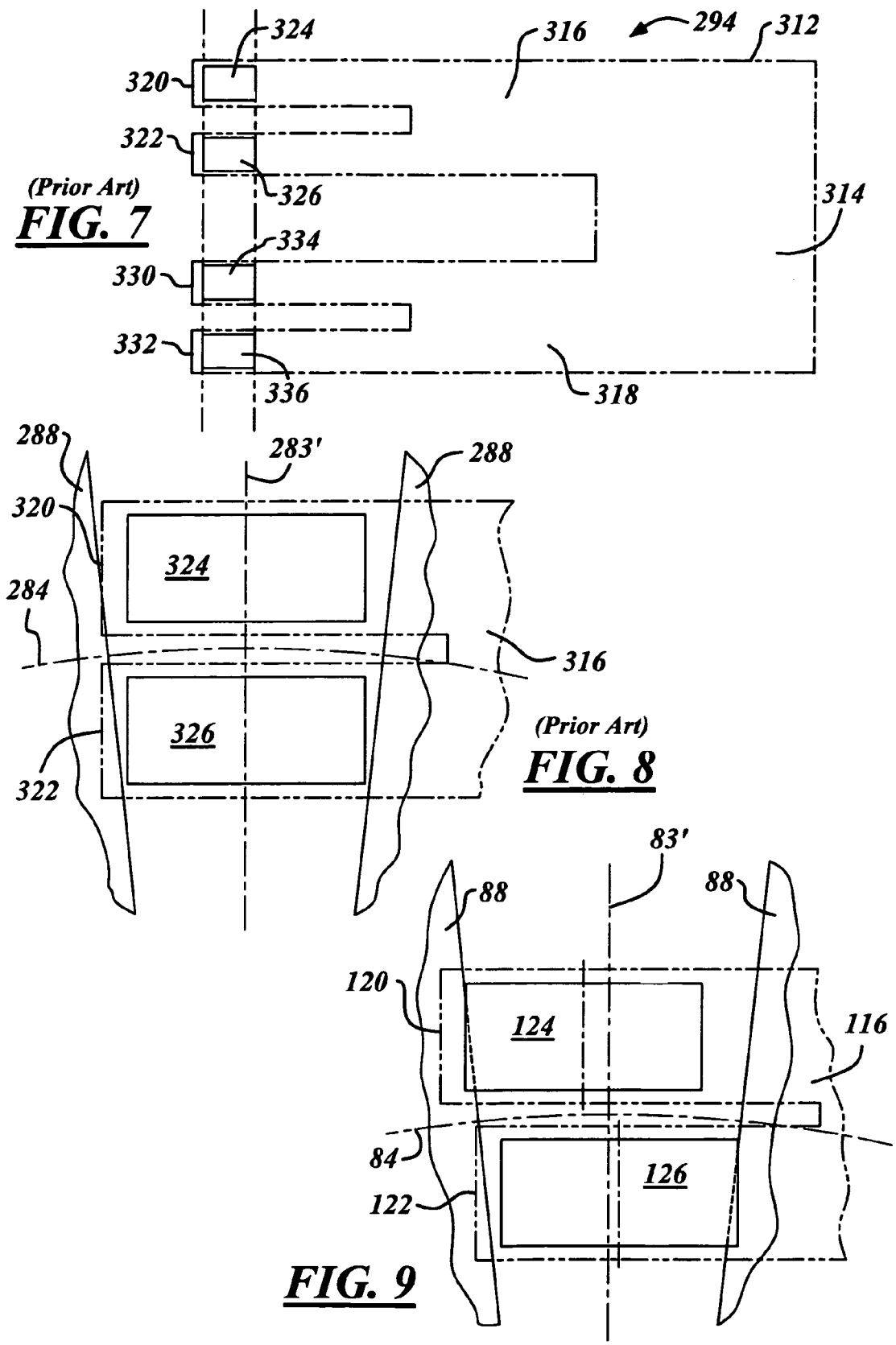

FUEL LEVEL SENSOR VARIABLE RESISTOR ASSEMBLY

CROSS-REFERENCE TO RELATED APPLICATION

Applicants claim priority of U.S. Provisional Application Ser. No. 60/684,272, filed May 25, 2005.

FIELD OF THE INVENTION

This invention relates generally to automotive fuel level sensors, and more particularly to a variable resistor assembly for a fuel level sensor.

BACKGROUND OF THE INVENTION

A variable resistor assembly is often used with a fuel level sensor to detect a change in fuel level in a fuel tank of an automobile. A typical variable resistor assembly includes a resistor that is variable so that its resistance value may be changed by mechanical movement of a wiper, which is attached to a float responsive to changes in fuel level in the fuel tank. The typical variable resistor assembly may include the wiper, a resistor card including a ceramic substrate, two separate terminals on the substrate, and two separate and respective arcuate resistive areas on the substrate that are electrically connected with the terminals. The arcuate resistive areas may be segmented into a plurality of conductive contact segments. The wiper bridges the resistive areas to complete the variable resistor, is pivotably mounted in relation to the resistor card, and has one or more contactors adapted for contacting the arcuate resistive areas as the wiper sweeps thereacross.

A typical fuel level sensor includes a float linked to the wiper of the variable resistor assembly by an actuator arm to vary the resistance value of the resistor in accordance with the position of the float. As the level of fuel within a fuel tank changes, the float member and actuator arm move and thereby cause the wiper to slide over the arcuate resistive areas to change an effective length of the variable resistor between the terminals and thereby vary the effective resistance of the variable resistor. In accordance with the change in resistance, the output voltage of the resistor card changes and, thus, effects a change—such as from "Full" toward "Empty"—in a remote fuel level indicator.

In use, existing fuel level sensors may have drawbacks. For example existing fuel level sensors can perform erratically when a wiper contactor falls in between, and momentarily out of contact with, adjacent conductive contact segments of the resistive area. In other words, a portion of the variable resistor is momentarily opened or interrupted, thereby causing voltage spikes to be output from the fuel level sensor to a liquid level indicator. Another problem involves "catching" of wiper contactor corners on angled conductive contact segments of an arcuate resistive area. When a wiper sweeps across the resistive area, the sharp corners of the contactors can "catch" on the angled conductive contact segments, thereby causing noisy operation of the variable resistor.

SUMMARY OF THE INVENTION

A fuel level sensor variable resistor assembly includes a resistive area and a wiper constructed to sweep thereacross while maintaining continuous contact therewith to prevent any open circuit conditions of the resistor. The resistive area includes a plurality of radially oriented and spaced apart conductive contact segments, and the wiper includes an arm and at least two contactors carried by the arm. The contactors are arranged on the arm such that the contactors collectively contact at least two adjacent segments of the plurality of radially oriented and spaced apart conductive contact segments at any given instant, wherein the contactors collectively make contact with a first contact segment of the at least two adjacent segments before collectively breaking contact with a second contact segment of the at least two adjacent segments, thereby preventing an open circuit condition of the variable resistor assembly. Preferably, the at least two contactors are laterally offset with respect to one another and/or oriented at an angle with respect to the radially oriented conductive contact segments.

At least some of the objects, features and advantages that may be achieved by at least certain embodiments of the invention include providing a variable resistor assembly that is readily adaptable to various liquid level sensors; prevents an open circuit condition thereof; minimizes use of relatively expensive precious metals; is of relatively simple design and economical manufacture and assembly, rugged, durable, reliable, and in service has a long useful life.

Of course, other objects, features and advantages will be apparent in view of this disclosure to those skilled in the art. Various other devices embodying the invention may achieve more or less than the noted objects, features or advantages.

BRIEF DESCRIPTION OF THE DRAWINGS

These and other objects, features and advantages of the present invention will be apparent from the following detailed description of the preferred embodiment and best mode, appended claims, and accompanying drawings in which:

FIG. 4 is a front view of a wiper carried by a wiper saddle of the fuel level sensor mechanism of FIG. 1;

FIG. 5 is a top end view of the wiper saddle and wiper of FIG. 4, illustrating the wiper deflected to its working height as if it were in contact with the resistor card;

FIG. 6 is an enlarged side view of a contactor of the wiper of FIG. 3;

FIG. 7 is a plan view of a prior art wiper including straight and aligned contactors;

FIG. 8 is a partial schematic view of straight and aligned prior art wiper contactors overlaid on a partially shown resistive area including adjacent conductive contact segments;

FIG. 9 is a schematic view of contactors of the exemplary wiper of FIG. 3 that are staggered or laterally offset and overlaid on a resistive area including adjacent conductive contact segments;

DETAILED DESCRIPTION OF THE PREFERRED EMBODIMENTS

Figure 1:
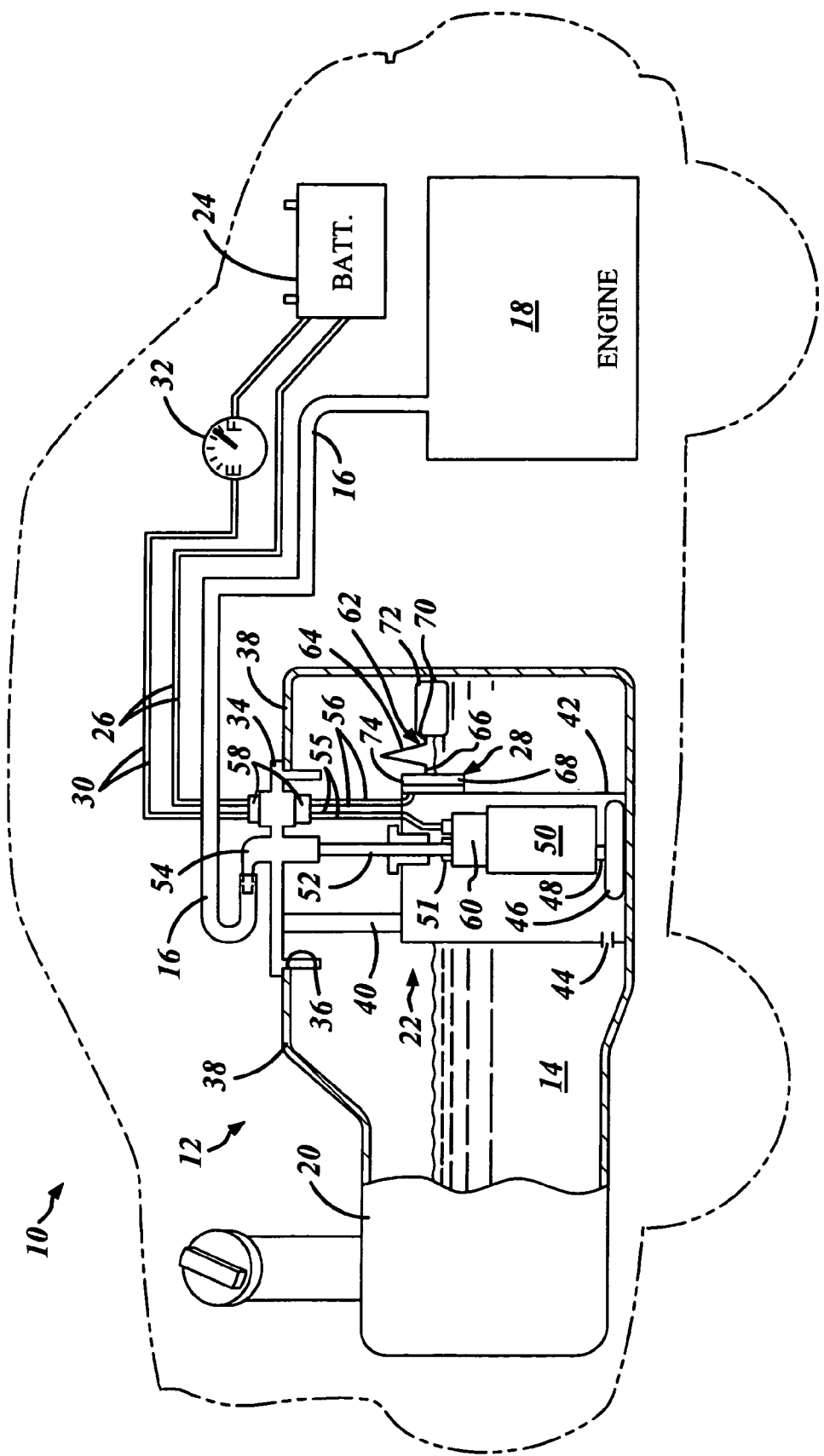
FIG. 1 is a schematic view of a vehicle including a fuel tank equipped with a fuel pump module having an exemplary embodiment of a fuel level sensor mechanism.

Referring in detail to the drawings, FIG. 1 schematically illustrates a vehicle 10 including a fuel tank assembly 12 for storing liquid hydrocarbon fuel 14 and supplying the fuel 14 through a fuel line 16 to an internal combustion engine 18 that mechanically powers the vehicle 10. The fuel tank assembly 12 includes a fuel tank 20 for housing the fuel 14 and a fuel pump module 22 mounted within the fuel tank 20 that supplies fuel 14 from the fuel tank 20 to the engine 18 and is electrically powered by a vehicle battery 24 via wires 26. The fuel pump module 22 also includes a fuel level sensor 28 for sensing the level of the fuel 14 within the fuel tank 20 and sending a signal, via wires 30, indicative of the fuel level to a fuel level indicator 32 for observation or use by a vehicle driver within a passenger compartment of the vehicle 10.

When the fuel pump module 22 is fully assembled to the fuel tank 20, a flange 34 of the module 22 is engaged sealably with an aperture 36 in a fuel tank wall 38 and the fuel pump module 22 is suspended within the fuel tank 20 from the flange 34, by one or more posts 40 and a housing 42. The housing 42 has a fuel inlet 44 to communicate the fuel 14 within the fuel tank 20 to a fuel filter 46 connected to a fuel inlet 48 of a fuel pump 50. The fuel pump 50 has a fuel outlet 51 that is connected to an outlet tube 52 that communicates through a fuel supply fitting 54 of the flange 24 with the fuel line 16. Electrical leads 55, 56, with associated connectors 58, extend through the flange providing electrical power to an electric motor 60, which drives the fuel pump 50, and to the fuel level sensor 28.

Still referring to FIG. 1, the fuel level sensor 28 preferably includes a wiper float mechanism 62, which has an elongated float arm 64 having a base end 66 bent at an approximate right angle and carried pivotally by a sensor base 68. A distal float end 70 of the float arm 64 is also bent at an approximate right angle and pivotally carries a buoyant or hollow plastic float 72. The buoyant float 72 may be generally planar and rectangular or cylindrical in shape and floats on the surface of the fuel 14 contained within the fuel tank 20. The length of the float arm 64 is dictated by the shape or depth of the fuel tank 20 and should be long enough to allow the float 72 to float upon the surface of the fuel 14 between a maximum and minimum elevation (i.e. full to empty fuel tank conditions). As the fuel level changes, the float 72 rises or lowers with the surface of the fuel 14 causing the float arm 64 to pivot about the base end 66, thus sliding, sweeping, or wiping an electrically conductive wiper or contactor (not shown) across a portion of the fuel level sensor 28 to produce the fuel level signal carried by the leads 56 and wires 30 to the fuel level indicator 32.

Figure 2:
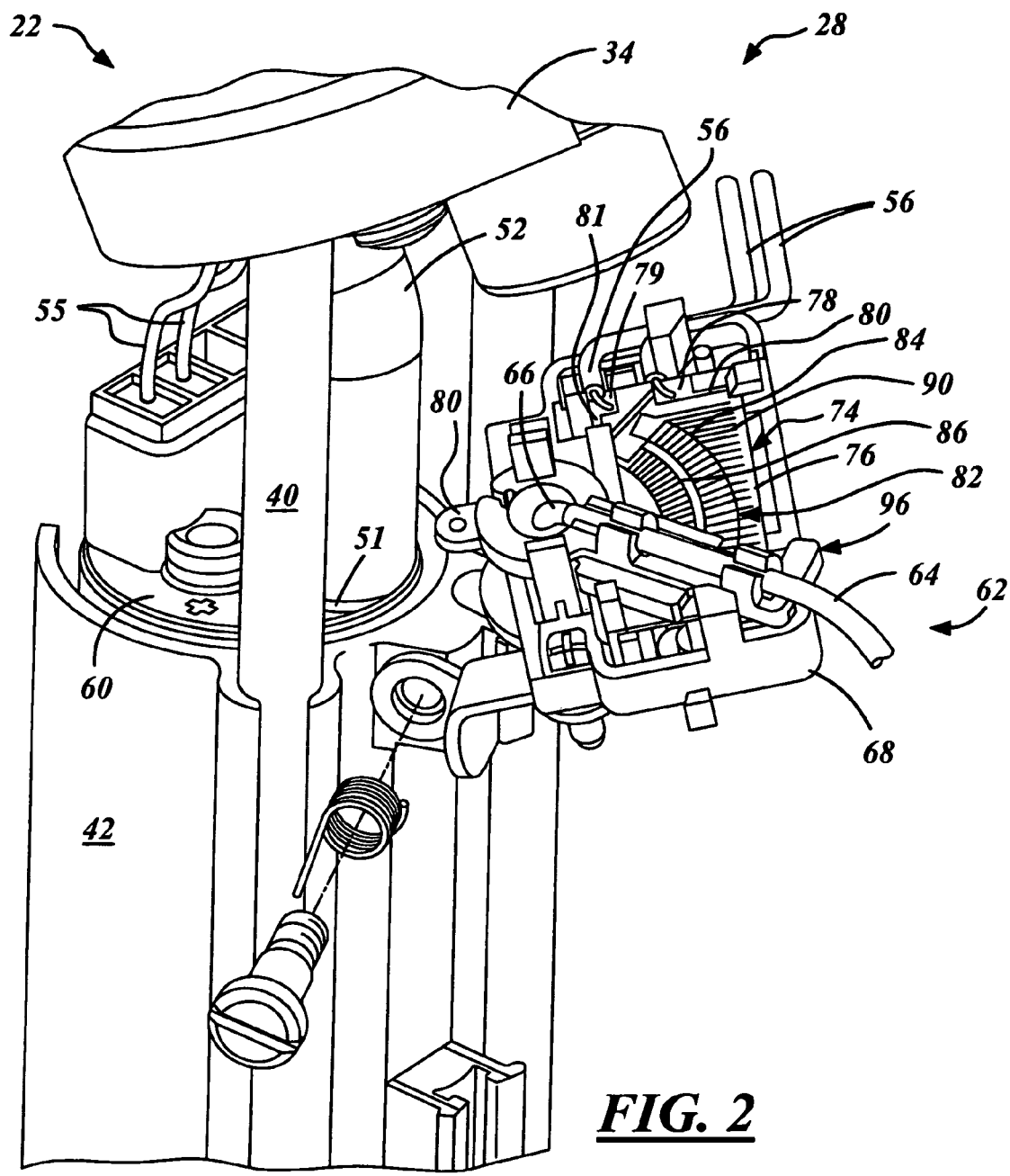
FIG. 2 is a partial enlarged perspective view of the fuel pump module illustrating the fuel level sensor mechanism.
Figure 3:
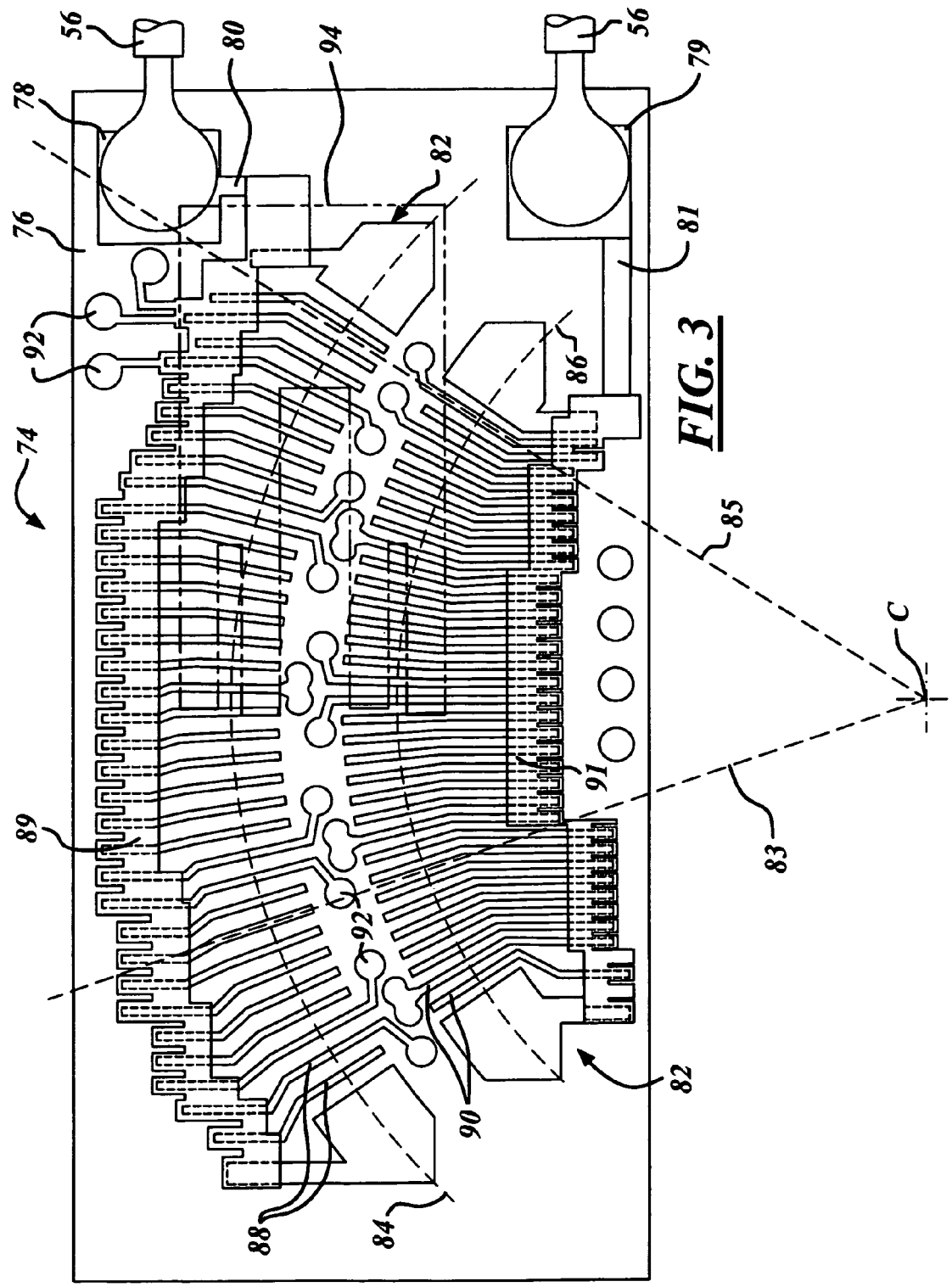
FIG. 3 is a plan view of an exemplary resistor card of the fuel level sensor mechanism of FIG. 2.

Referring now to FIGS. 2 and 3, the fuel level sensor 28 includes a variable resistor card 74 carried by the sensor base 68 and that is composed of a ceramic substrate 76 imprinted with variable resistor elements. The leads 56 are soldered to conductive connection pads 78, 79 imprinted on the ceramic substrate 76. The variable resistor card 74 also includes generally resistive areas 82 imprinted upon the ceramic substrate 76 that are generally semi-circular or arcuate shapes, preferably concentrically arranged with respect to the pivot axis of the float arm 64. The term arcuate includes any shape that accommodates substantially uninterrupted contact with a contactor that moves in a pivotable manner across the arc. Alternatively, the resistive areas 82 may be of any suitable desired shape and/or configuration. First and second printed wires, or electrically conductive pathways 80, 81, are imprinted upon the ceramic substrate 76 to electrically communicate with the conductive connection pads 78, 79 to the resistive areas 82.

The resistive areas 82 include a generally conductive first contact arc 84 and a generally conductive second contact arc 86. The contact arcs 84, 86 are preferably segmented to define a plurality of conductive contact segments 88, 90 that are separated by open spaces. The arcs 84 and 86 preferably share a common center C, which represents the pivot point of the float arm 64. Imaginary radial lines 83 and 85 correspond respectively to the segments 87 of the first contact arc 84 and the segments 88 of the second contact arc 86, to show that the segments are radially oriented with respect to the center C. Also, a number of generally conductive test pads 92 are provided in electrical communication with the resistive areas 82 as a manufacturing aid, as is generally known to those of ordinary skill in the art. Similarly, laterally opposed conductive contact segments at the opposite ends of the contact arcs 84, 86 are larger than the other conductive contact segments 88, 90 therebetween and may be used as test pads as well as conductive contact segments 88, 90, as is known to those of ordinary skill in the art.

The resistive areas 82 also include resistor traces 89, 91 that correspond to the contact arcs 84, 86, wherein the pluralities of conductive contact segments 88, 90 are electrically communicated to the corresponding resistor traces 89, 91. Accordingly, as is known to those of ordinary skill in the art, the resistor traces 89, 91 enable the effective resistance of the contact arcs 84, 86 to increase incrementally from the ends of the arcs 84, 86 that are connected to the printed wires 80, 81, to oppositely disposed other ends.

The second contact arc 86 corresponds to, and is spaced radially inside of, the first contact arc 84 so that an electrical wiper 94, which is mounted on a bottom side of a nonconductive wiper saddle 96 carried by the float arm 64, contacts and electrically bridges a portion of the second contact arc 86 with a predetermined one or more of the conductive contact segments 88 of the first contact arc 84 as the float arm 64 sweeps across the card 74 as the buoyant float 72 responds to changes in fuel level. The pathways 80, 81 do not come into contact with the wiper 94. Those of ordinary skill in the art will recognize that either one of the contact arcs 84, 86 could also be provided instead as a generally conductive contact arc that is relatively continuous, instead of segmented. In any case, a variable resistor of the variable resistor card 74 substantially includes the resistive areas 82 and the wiper 94.

The various elements of the variable resistor card 74 may be produced using any suitable process known to those of ordinary skill in the art, including but not limited to depositing molten material, chemically etching and/or coating the ceramic substrate 76, attaching or adhering separately manufactured elements to the ceramic substrate 76, and the like. In any case, the first and second contact arcs 84, 86 and, particularly, the plurality of conductive contact segments 88, 90 are all preferably composed of a thick film conductive material such as Dupont® 7484 or 4597 materials, or the like. The resistor traces 89, 91 are preferably additionally composed of a thick film resistor glaze such as Dupont® 2000 series or the like, that is deposited as a top layer over radially outward portions of the conductive contact segments 88 and over radially inward portions of the other conductive contact segments 90.

FIGS. 4 and 5 illustrate the wiper 94 carried by the wiper saddle 96 of the fuel level sensor mechanism 62. The wiper saddle 96 is preferably composed of any suitable electrically nonconductive material such as an acetal plastic material or any other suitable polymeric material, and includes a cylindrical hub 100 defining a pivot axis of the saddle 96 and having diametrically opposed retainer arms 102 extending therefrom. The wiper saddle 96 further includes an arm 104 that extends radially from the hub 100 and attaches the saddle 96 to the float arm 64 via resilient prongs 106 extending axially from the arm 104. The arm 104 includes a wiper holder 108 integrally with and extending transversely from a mid-section of the arm 104. The wiper holder 108 terminates in an integral raised shoulder 110. Preferably, the wiper 94 is insert molded into the raised shoulder 110 of the saddle 96, but may be attached in any other suitable manner.

The wiper 94 is preferably composed of a stamped metal, such as a copper alloy or any other suitable conductive material, and includes a bifurcated wiper arm 112 having a base portion 114 connecting radially spaced apart tines 116, 118 of the arm 112. A first one of the tines 116 corresponds to the first contact arc 84 of the variable resistor, and a second one of the tines 118 corresponds to the second contact arc 86 of the variable resistor. The first tine 116 is bifurcated into first and second radially spaced apart fingers 120, 122 that carry, respectively, first and second contactors 124, 126. Likewise, the second tine 118 is bifurcated into radially spaced apart fingers 130, 132 that carry, respectively, first and second contactors 134, 136. As best shown in FIG. 5 in assembly, the tines 116, 118 of the cantilevered wiper 94 are resiliently flexed or deflected to their working position or height in a direction toward the arm 104.

Referring to FIGS. 4 and 5, the contactors 124, 126, 134, 136 are preferably the same or substantially similar in size, and are not aligned, but are laterally or circumferentially offset along a direction that is substantially transverse with respect to a radial line R extending from a center C' of the hub 100. Preferably, the first finger 120 of the first tine 116 is longer than the second finger 122. In any case, the first contactor 124 of the first tine 116 is staggered or laterally offset from the second contactor 126, and the first contactor 134 of the second tine 118 is staggered or laterally offset from the second contactor 136, for the purpose described in detail below.

As best shown in FIG. 6 by representative first contactor 122 of the first tine 116, each contactor includes a primary radius 140 and corner radii 142. Preferably, the ratio of the primary radius 140 to the corner radii 142 is on the order of about four to one, but may be suitably lesser or greater. The primary radius 140 is intended to be in contact with the conductive contact segments of the respective contact arc. Preferably, each contactor 124, 126, 128, 130 is composed of a precious metal alloy or precious metal, such as gold, platinum, and/or the like, but may be composed of any suitable conductive material. Also preferably, each contactor 124, 126, 128, 130 is welded or brazed to the arm 112, but any other suitable attachment method is contemplated which securely attaches each contactor to the arm 112 and provides good electrical conductivity between them.

FIG. 7 illustrates a prior art wiper 294 including a bifurcated wiper arm 312 having a base portion 314 connecting spaced apart tines 316, 318 of the arm 312. The first tine 316 is bifurcated into spaced apart fingers 320, 322 that carry, respectively, first and second contactors 324, 326. Likewise, the second tine 318 is bifurcated into spaced apart fingers 330, 332 that carry, respectively, first and second contactors 334, 336. Note that all of the contactors 324, 326, 334, 336 are the same or substantially similar in size and are aligned, and are not staggered or laterally offset.

FIG. 8 illustrates an open circuit problem of the prior art. As shown, contactor surface areas or "footprints" of two of the contactors 324, 326 are superimposed over a contact arc 284 including adjacent conductive contact segments 288. The contactors 324, 326 are aligned along a radius or radial line 283', and are disposed between, instead of overlapping the adjacent segments 288. Thus, as shown, one or more gaps may exist between the contactors 324, 326 and the segments 288 when the contactors 324, 326 fall in between, and momentarily out of contact with the adjacent segments 288. In other words, the tine 316 is at least momentarily conductively disconnected from the segments 288 of the contact arc 284 and, thus, the variable resistor is momentarily opened or interrupted, thereby causing voltage spikes. The same problem applies to the contactors 334, 336 and fingers 330, 332 of the other tine 318, shown in FIG. 7.

The open circuit problem is especially prevalent in cases where the contactors 324, 326 have "rolled" onto one of the corner radii, instead of maintaining contact between the primary radius and the segments of the contact arc, thereby yielding a smaller footprint for contact with the respective contact arc. One solution to the problem is to simply increase the size of the contactors 324, 326 to prevent the contactors 324, 326 from falling in-between the adjacent segments. However, because contactors are composed of relatively expensive precious metals, this solution is relatively expensive and, thus, not optimal.

FIG. 9 illustrates contactor surface areas or "footprints" of two of the contactors 124, 126 superimposed over the contact arc 84 including adjacent conductive contact segments 88. In accordance with this exemplary embodiment, it is desirable to arrange the contactors 124, 126 on the tine 116 such that the contactors 124, 126 are always, collectively, in contact with two adjacent segments 88 of the contact arc 84. In other words, at any given instant at least one of the contactors 124, 126 is in contact with a first segment of the two adjacent segments 88 and at least one other of the contactors 124, 126 is in contact with a second segment of the two adjacent segments 88, wherein the contactors 124, 126 collectively make contact with the first contact segment before collectively breaking contact with the second contact segment. Therefore, the tine 116 is always in contact with at least one of the segments 88 of the contact arc 84, and the same solution applies to the contactors 134, 136 and fingers 130, 132 of the other tine 118, thereby preventing an open circuit condition of the variable resistor. As shown, the contactors 124, 126 are arranged squarely with respect to an imaginary line 83' that extends radially between the adjacent segments 88.

Figure 10:
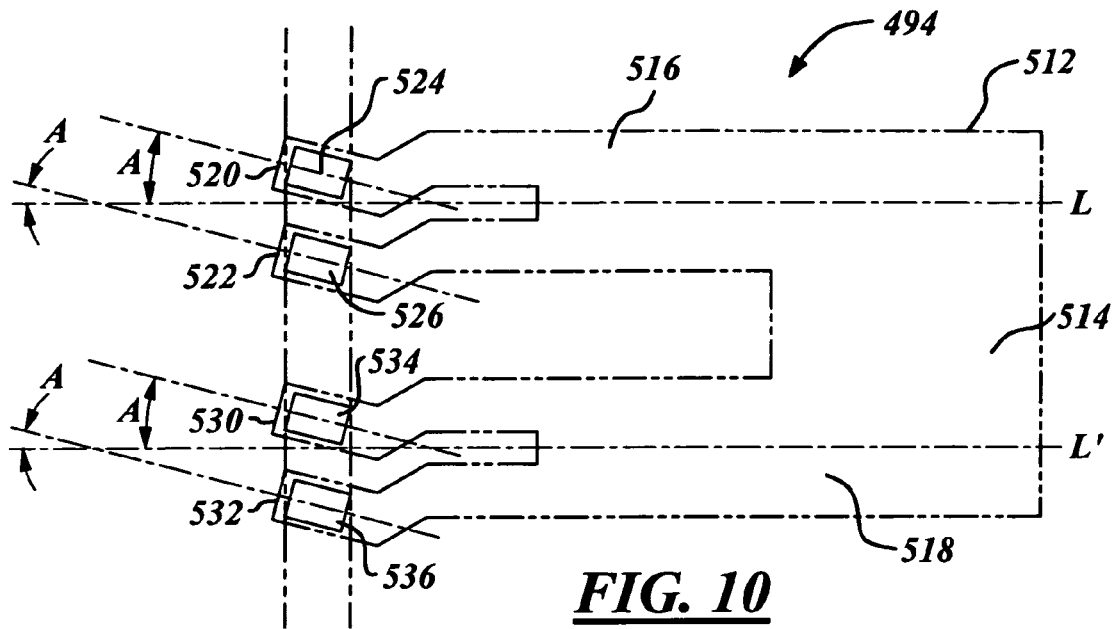
FIG. 10 is a plan view of an alternative exemplary wiper.

FIG. 10 illustrates an alternative wiper 494 that is designed to prevent contactors from falling in between adjacent wiper segments, and yet permits use of relatively small and less expensive contactors. The wiper 494 includes a bifurcated wiper arm 512 having a base portion 514 connecting spaced apart tines 516, 518 of the arm 512. The first tine 516 is bifurcated into angled spaced apart fingers 520, 522 that carry, respectively, first and second contactors 524, 526. Likewise, the second tine 518 is bifurcated into angled spaced apart fingers 530, 532 that carry, respectively, first and second contactors 534, 536.

The fingers 520, 522, 530, 532 are preferably bent at an angle A of about thirteen degrees with respect to one or more laterally extending axes L, L' of the wiper 494. But the fingers may instead be bent at an angle between ten and fifteen degrees, or between five and forty-five degrees, or at any other suitable angle. Alternatively, it is contemplated that the just the contactors 524, 526, 534, 536 could be angled and the fingers 520, 522, 530, 532 could be straight but larger to accommodate the angled contactors. Note that all of the contactors 524, 526, 534, 536 are the same or substantially similar in size and are substantially aligned, and are not staggered or laterally offset.

Figure 11:
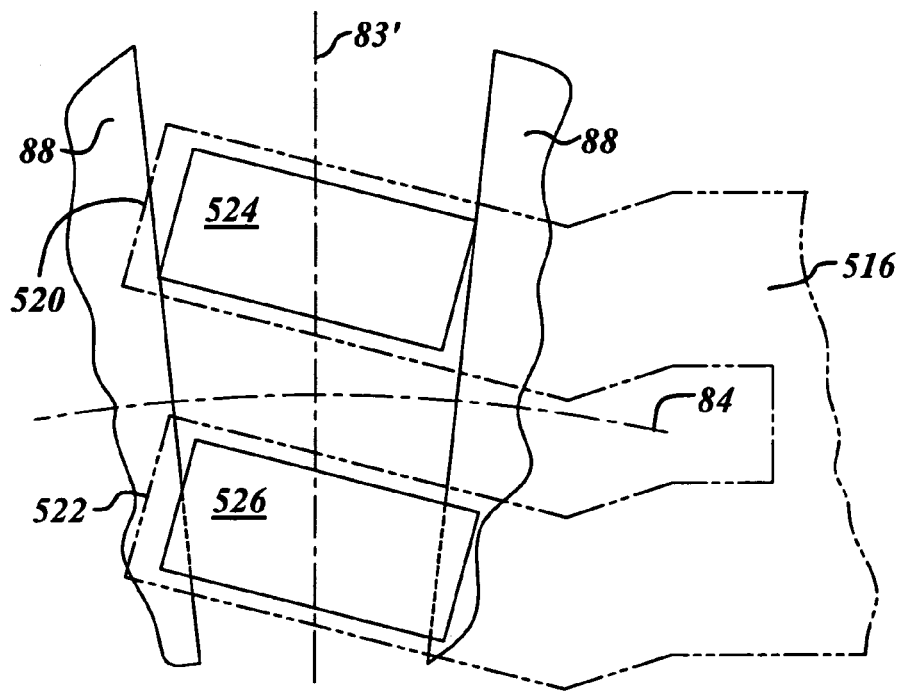
FIG. 11 is a schematic view of angled contactors of the alternative wiper of FIG. 10 overlaid on a resistive area including adjacent conductive contact segments.

FIG. 11 illustrates contactor surface areas or "footprints" of two of the contactors 524, 526 superimposed over the contact arc 84 including the adjacent conductive contact segments 88. In accordance with this exemplary embodiment, it is desirable to angle the contactors 524, 526 such that at least opposed corners of the contactors 524, 526 are in contact with adjacent segments 88 of the contact arc 84. In other words, at any given instant at least one of the contactors 524, 526 is in contact with one of two adjacent segments 88. Therefore, the tine 516 is always in contact with at least one of the segments 88 of the contact arc 84. The same solution applies for the contactors 534, 536 and fingers 530, 532 of the other tine 518. As shown, the contactors 524, 526 are arranged or oriented at an angle, instead of arranged squarely, with respect to an imaginary line 83' that extends radially between the adjacent segments 88. Accordingly, the fingers and/or contactors are, thus, oriented at an angle with respect to the radially oriented conductive contact segments 88 of the variable resistor card 74.

Figure 12:
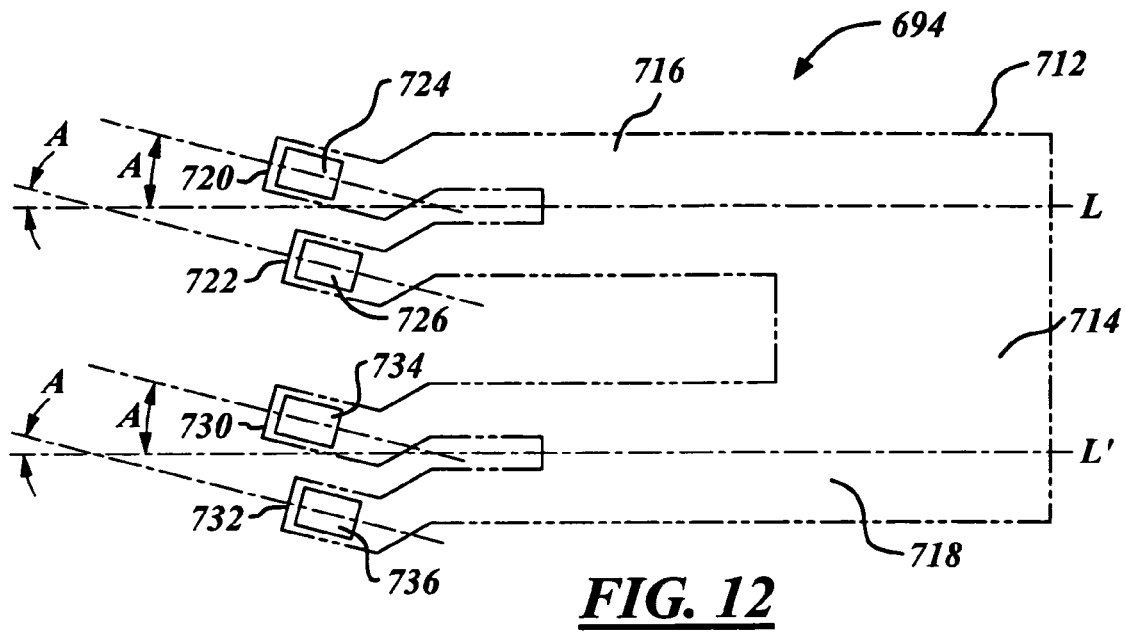
FIG. 12 is a plan view of yet another alternative exemplary wiper.

FIG. 12 illustrates another alternative wiper 694 that is designed to prevent contactors from falling in between adjacent wiper segments, and yet permits use of relatively small and less expensive contactors. The wiper 694 includes a bifurcated wiper arm 712 having a base portion 714 connecting spaced apart tines 716, 718 of the arm 712. The first tine 716 is bifurcated into angled, staggered, and spaced apart fingers 720, 722 that carry, respectively, first and second contactors 724, 726. Likewise, the second tine 718 is bifurcated into angled spaced apart fingers 730, 732 that carry, respectively, first and second contactors 734, 736.

The fingers 720, 722, 730, 732 are preferably bent at an angle A of about thirteen degrees with respect to one or more laterally extending axes L, L' of the wiper 694. But the fingers may instead be bent at an angle between ten and fifteen degrees, or between five and forty-five degrees, or at any other suitable angle. Alternatively, it is contemplated that the just the contactors 724, 726, 734, 736 could be angled and the fingers 720, 722, 730, 732 could be straight but larger to accommodate the angled contactors.

Moreover, the contactors 724, 726, 734, 736 are preferably the same or substantially similar in size, and are not aligned, but are laterally or circumferentially offset, similar to the arrangement shown in FIG. 4. Preferably, the first finger 720 of the first tine 716 is longer than the second finger 722. In any case, the first contactor 724 of the first tine 716 is staggered or laterally offset from the second contactor 726, and the first contactor 734 of the second tine 718 is staggered or laterally offset from the second contactor 736.

Figure 13:
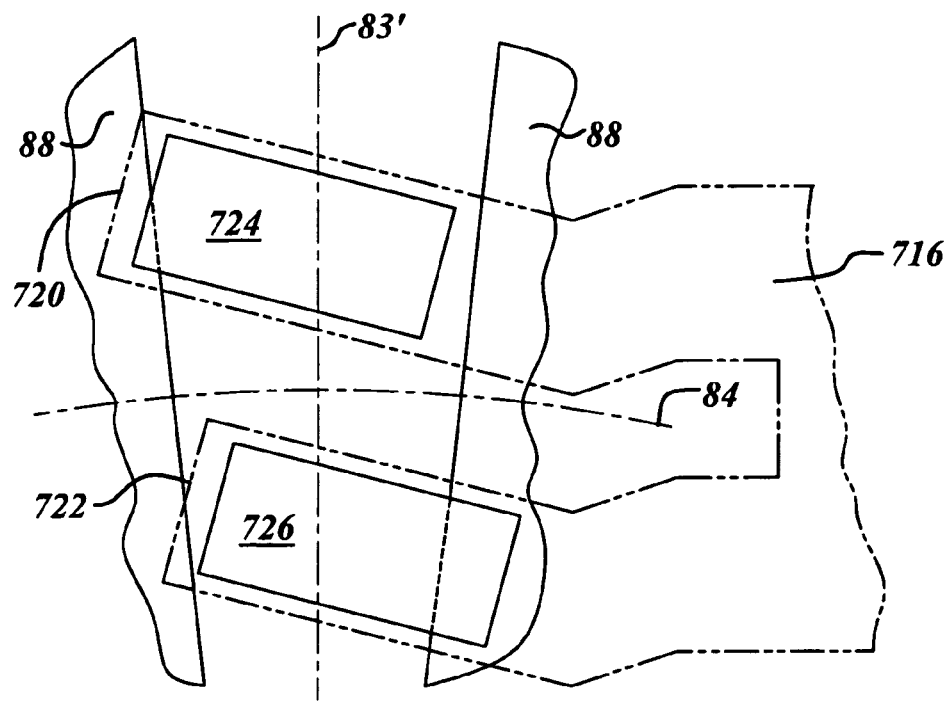
FIG. 13 is a schematic view of an alternative exemplary wiper contactors that are angled and staggered, and illustrated as overlaid on a resistive area including adjacent conductive contact segments.

FIG. 13 illustrates contactor surface areas or "footprints" of two of the contactors 724, 726 superimposed over the contact arc 84 including the adjacent conductive contact segments 88. According to this exemplary embodiment, it is desirable to angle and stagger the contactors 724, 726 such that at least opposed corners of the contactors 724, 726 are in contact with adjacent segments 88 of the contact arc 84. In other words, at any given instant at least one of the contactors 724, 726 is in contact with one of two adjacent segments 88. Therefore, the tine 716 is always in contact with at least one of the segments 88 of the contact arc 84. The same solution applies for the contactors 734, 736 and fingers 730, 732 of the other tine 718.

While the forms of the invention herein disclosed constitute a presently preferred embodiment, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

What is claimed is:

1. A wiper of a fuel level sensor variable resistor having radially oriented and spaced apart conductive contact segments, comprising:
   an arm adapted to be moved along an arcuate path; and
   at least two contactors carried by the arm, the at least two contactors being at least one of inclined at an angle with respect to one or more laterally extending axes of the arm or laterally offset with respect to one another so that a portion of one contactor is circumferentially offset from at least one other contactor relative to the direction of movement of the arm.

2. The wiper of claim 1 wherein the arm is cantilevered and bifurcated into spaced apart tines.

3. The wiper of claim 2 wherein the spaced apart tines are each bifurcated into spaced apart fingers that each carry one of the at least two contactors.

4. The wiper of claim 1 wherein the contactor is oriented at an angle of between ten and fifteen degrees with respect to at least one laterally extending axis of the arm.

5. The wiper of claim 1 wherein the at least two contactors are laterally offset with respect to one another and oriented at an angle with respect to the conductive contact segments.

6. A wiper of a fuel level sensor variable resistor having radially oriented and spaced apart conductive contact segments, comprising:
   an arm that is cantilevered and bifurcated into spaced apart tines, wherein the spaced apart tines are each bifurcated into spaced apart fingers that are of different lengths; and
   at least two contactors carried by the arm, the at least two contactors being at least one of laterally offset with respect to one another or oriented at an angle with respect to the conductive contact segments of the variable resistor, wherein the fingers each carry one of the at least two contactors.

7. The wiper of claim 6 wherein each of the spaced apart fingers includes a portion oriented at an angle with respect to at least one laterally extending axis of the arm.

8. A variable resistor for a fuel level sensor, comprising:
   a resistive area including a first contact arc and a second contact arc that shares a common center with the first contact arc, and conductive contact segments being radially oriented relative to the common center and spaced apart; and
   a wiper including an arm and at least two contactors carried by the arm, the at least two contactors being arranged on the arm such that the at least two contactors are always collectively in contact with at least two adjacent segments of the conductive contact segments.

9. The variable resistor of claim 8 wherein the at least two contactors are at least one of laterally offset with respect to one another or oriented at an angle with respect to the conductive contact segments.

10. The variable resistor of claim 9 wherein the at least two contactors are oriented at an angle with respect to the conductive contact segments and are smaller in at least one dimension than spaces between the conductive contact segments.

11. The variable resistor of claim 8 wherein the wiper arm is cantilevered and bifurcated into spaced apart tines.

12. The variable resistor of claim 11 wherein the spaced apart tines are each bifurcated into spaced apart fingers that each carry one of the at least two contactors.

13. The variable resistor of claim 8 wherein the at least two contactors are laterally offset with respect to one another and oriented at an angle with respect to the conductive contact segments.

14. A variable resistor for a fuel level sensor, comprising:
a resistive area including conductive contact segments being radially oriented and spaced apart; and
a wiper including an arm that is cantilevered and bifurcated into spaced apart tines and at least two contactors carried by the arm, the at least two contactors being arranged on the arm such that the at least two contactors are always collectively in contact with at least two adjacent segments of the conductive contact segments, wherein each of the spaced apart fingers includes a portion oriented at an angle with respect to at least one laterally extending axis of the arm.

15. The variable resistor of claim 14 wherein the at least two contactors are oriented at an angle of between five and forty-five degrees with respect to the conductive contact segments.

16. A fuel level sensor comprising:
a float arm mechanism including:
 a base;
 a float;
 a float arm having a float end carrying the float and a base end pivotably carried by the base;
a variable resistor card carried by the base of the float arm mechanism and including:
 a substrate at least partially composed of a ceramic material;
 an arcuate resistive area disposed on the substrate and including two resistor traces each having a plurality of conductive contact segments with the conductive contact segments of one resistor trace being generally parallel to the conductive contact segments of the other resistor trace, and the conductive contact segments being radially oriented and substantially equidistantly spaced; and
 a wiper including an arm and at least two contactors carried by the arm, the at least two contactors being arranged on the arm such that the at least two contactors are always collectively in contact with at least two adjacent segments of the resistive area, wherein at any given instant at least one of the contactors is in contact with a segment of the at least two adjacent segments and at least one other of the contactors is in contact with another segment of the at least two adjacent segments, and further wherein the at least two contactors collectively make contact with the first contact segment before collectively breaking contact with the second contact segment.

17. The fuel level sensor of claim 16 wherein the at least two contactors are at least one of laterally offset with respect to one another or oriented at an angle with respect to the conductive contact segments.

18. The fuel level sensor of claim 17 wherein the at least two contactors are oriented at an angle with respect to the conductive contact segments and are smaller in at least one dimension than spaces between the conductive contact segments.

19. The fuel level sensor of claim 16 wherein the wiper arm is cantilevered and bifurcated into spaced apart tines.

20. The fuel level sensor of claim 19 wherein the spaced apart tines are each bifurcated into spaced apart fingers that each carry one of the at least two contactors.

21. The fuel level sensor of claim 19 wherein each of the spaced apart fingers includes a portion oriented at an angle with respect to at least one laterally extending axis of the arm.

22. The fuel level sensor of claim 21 wherein the at least two contactors are oriented at an angle of between five and forty-five degrees with respect to the conductive contact segments.

23. The fuel level sensor of claim 16 wherein the at least two contactors are laterally offset with respect to one another and oriented at an angle with respect to the conductive contact segments.

* * * * *